United States Patent
Girt et al.

(10) Patent No.: US 8,101,292 B2
(45) Date of Patent: *Jan. 24, 2012

(54) MAGNETIC STORAGE MEDIA WITH AG, AU-CONTAINING MAGNETIC LAYERS

(75) Inventors: Erol Girt, Berkeley, CA (US); Chung Yuang Shih, Cupertino, CA (US); Miaogen Lu, Fremont, CA (US); Kueir-Weei Chour, San Jose, CA (US); Connie Chunling Liu, San Jose, CA (US); Mariana Rodica Munteanu, Santa Clara, CA (US); Jean Ling Lee, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/771,962

(22) Filed: Apr. 30, 2010

(65) Prior Publication Data

US 2010/0209739 A1    Aug. 19, 2010

Related U.S. Application Data

(63) Continuation of application No. 11/361,004, filed on Feb. 24, 2006, now Pat. No. 7,736,766.

(51) Int. Cl.
*G11B 5/673*    (2006.01)

(52) U.S. Cl. ........................................... 428/829

(58) Field of Classification Search ........................ None
See application file for complete search history.

(56) References Cited

U.S. PATENT DOCUMENTS

| | | | |
|---|---|---|---|
| 6,440,589 B1 | 8/2002 | Fullerton et al. | |
| 6,682,834 B2 | 1/2004 | Okuyama et al. | |
| 6,723,450 B2 | 4/2004 | Do et al. | |
| 6,815,082 B2 * | 11/2004 | Girt | 428/828.1 |
| 6,964,819 B1 | 11/2005 | Girt et al. | |
| 7,128,987 B2 * | 10/2006 | van de Veerdonk et al. | 428/828 |
| 7,282,277 B2 | 10/2007 | Munteanu et al. | |
| 7,311,983 B2 * | 12/2007 | Watanabe et al. | 428/829 |
| 7,368,187 B2 | 5/2008 | Okuyama et al. | |
| 7,393,601 B1 | 7/2008 | Chen et al. | |
| 7,419,730 B2 | 9/2008 | Bian et al. | |
| 7,736,766 B2 * | 6/2010 | Girt et al. | 428/829 |
| 2004/0146747 A1 * | 7/2004 | Nemoto et al. | 428/694 T |
| 2005/0058855 A1 * | 3/2005 | Girt | 428/694 TS |
| 2005/0233174 A1 * | 10/2005 | Munteanu et al. | 428/828 |
| 2005/0255337 A1 * | 11/2005 | Mukai | 428/831 |
| 2006/0210836 A1 * | 9/2006 | Gouke | 428/829 |
| 2006/0280972 A1 | 12/2006 | Gouke | |
| 2006/0286413 A1 | 12/2006 | Liu et al. | |

* cited by examiner

*Primary Examiner* — Kevin Bernatz
(74) *Attorney, Agent, or Firm* — Hollingsworth & Funk, LLC

(57) ABSTRACT

A magnetic recording medium having a Au, Ag-containing magnetic layer having Co, Cr, Ag and Au; the magnetic recording layer having Co-containing magnetic grains surrounded by substantially nonmagnetic Cr-containing grain boundaries; wherein said Ag and said Au are substantially immiscible in the Co-containing magnetic grains is disclosed.

13 Claims, 2 Drawing Sheets

Longitudinal Recording Bits

Perpendicular Recording Bits

MAGNETIC STORAGE MEDIA WITH AG, AU-CONTAINING MAGNETIC LAYERS

RELATED APPLICATIONS

This application is a continuation of U.S. application Ser. No. 11/361,004, filed Feb. 24, 2006, now U.S. Pat. No. 7,736,766, and entitled "MAGNETIC STORAGE MEDIA WITH Ag, Au- CONTAINING MAGNETIC LAYERS," the entire content of which is incorporated herein by reference.

FIELD OF INVENTION

The present invention relates to improved, high recording performance magnetic recording media comprising at least one Ag or Au-containing magnetic recording layer for improved segregation for obtaining sharper transitions between the magnetic grains and non-magnetic Cr-rich grain boundaries. More particularly, the invention relates to hard disk recording media with increased saturation magnetization (Ms) and magnetocrystalline anisotropy and narrower intrinsic switching field distribution.

BACKGROUND

Thin film magnetic recording media, wherein a fine-grained polycrystalline magnetic alloy layer serves as the magnetic recording layer, are generally classified as "longitudinal" or "perpendicular," depending on the orientation of the magnetic domains (bits) of the grains in the magnetic recording layer. FIG. 1, obtained from *Magnetic Disk Drive Technology* by Kanu G. Ashar, 322 (1997), shows magnetic bits and transitions in longitudinal and perpendicular recording.

The increasing demands for higher areal recording density impose increasingly greater demands on thin film magnetic recording media in terms of coercivity (Hc), remanent coercivity (Hcr), magnetic remanance (Mr), which is the magnetic moment per unit volume of ferromagnetic material, coercivity squareness (S*), signal-to-medium noise ratio (SMNR), and thermal stability of the media. These parameters are important to the recording performance and depend primarily on the microstructure of the materials of the media. For example, as the SMNR is reduced by decreasing the grain size or reducing exchange coupling between grains, it has been observed that the thermal stability of the media decreases.

Conventionally used storage media contain a magnetic recording layer having Co—Cr—Pt—B and Co—Cr—Ta alloys where B and Ta are mainly used to improve the segregation of Cr in the magnetic layer. A better segregation profile of Cr leads to a sharper transition between the magnetic grains and the non-magnetic Cr-rich grain boundaries, and thus, the recording media is expected to have higher saturation magnetization, Ms and magnetocrystalline anisotropy and narrower intrinsic switching field distribution.

As the storage density of magnetic recording disks has increased, the product of Mr and the magnetic layer thickness t has decreased and Hcr of the magnetic layer has increased. This has led to a decrease in the ratio Mrt/Hcr. To achieve a reduction in Mrt, the thickness t of the magnetic layer has been reduced, but only to a limit because the magnetization in the layer becomes susceptible to thermal instability. This instability has been attributed to thermal activation of small magnetic grains (the super-paramagnetic effect). Such thermal instability can cause undesirable decay of the output signal of the magnetic recording medium and data loss.

The thermal stability of a magnetic grain is to a large extent determined by $K_uV$, where $K_u$ is the magnetic anisotropy constant of the magnetic layer and V is the volume of the magnetic grain. As the magnetic layer thickness is decreased, V decreases. Thus, if the magnetic layer thickness is too thin, the stored magnetic information might no longer be stable at normal disk drive operating conditions.

One proposed solution to the problem of thermal instability is to increase $K_u$. However, the increase in $K_u$ is limited to the point where the coercivity $H_c$, which is approximately equal to $K_u/Mr$, becomes too large to be written by a conventional recording head. On the other hand, a reduction in Mr of the magnetic layer for a fixed layer thickness is limited by the coercivity that can be written. Increasing V by increasing inter-granular exchange can also increase thermal stability. However, this approach could result in a reduction in the SMNR of the magnetic layer.

Thus, there is a need for new materials for the magnetic recording layer that provide increased grain segregation in the magnetic layer, leading to higher Ms and improved recording performance.

SUMMARY OF THE INVENTION

The embodiments of the invention are directed to a longitudinal or perpendicular recording medium having an improved segregation within the magnetic layers having Ag, Au-containing layers. Ag and Au has low miscibility with Co at temperatures below 573 K. Results show that media with Au, Ag-containing magnetic layers have higher Ms and improved recording performance.

As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION

Magnetic layer without Au and Ag will be called "non Au or Ag-containing magnetic layer," ML, and magnetic layers with Au and Ag will be called "Au, Ag-containing magnetic layer," AuAgML.

Magnetic recording media having Co—Cr—Pt—B and Co—Cr—Ta alloys contain B and Ta to improve the segregation of Cr in the magnetic layer. A better segregation profile of Cr leads to a sharper transition between the magnetic grains and the non-magnetic Cr-rich grain boundaries, and thus, the recording media is expected to have higher saturation magnetization (Ms) and magnetocrystalline anisotropy ($K_u$) and narrower intrinsic switching field distribution.

The embodiments of the present invention are based upon recognition that the improvement in segregation profile of Cr atoms in CoCr-based alloy magnetic layers upon addition Ta and/or B thereto is not necessarily sufficient to provide media required able to satisfy the ever-increasing performance criteria and parameters required of high-performance magnetic disk recording media utilized in computer-related applications.

In pursuit of improved segregation within the magnetic layers Au, Ag-containing layers were investigated. Au and Ag were selected because of their low miscibility with Co at temperatures below 573 K. The embodiments of present invention are based upon the unexpected results of this invention that the addition of Au and Ag in the magnetic alloy of the magnetic recording medium further improves the segregation behavior and provides magnetic recording media with even sharper transitions (i.e., segregation profiles) between Co-containing magnetic grains and Cr-rich, non-magnetic grain boundaries than attainable by Ta and/or B additions to CoCr. Such embodiments of this invention resulted in improved media exhibiting increased $M_s$ and magnetocrystalline anisotropy and narrower intrinsic switching field distribution.

As a preliminary aspect of the investigation resulting in the present invention, the enthalpies of solution of solid X=Cu, Ag, Au in Y=Co, Pt, Cr and B (amount of X atoms is assumed to be so small so that all X atoms are surrounded only by Y atoms in the solution) was calculated following the procedure of A. R. Miedema, Physica B 182, 1 (1992). The results of the calculation are shown in FIG. 2.

Figure 2:
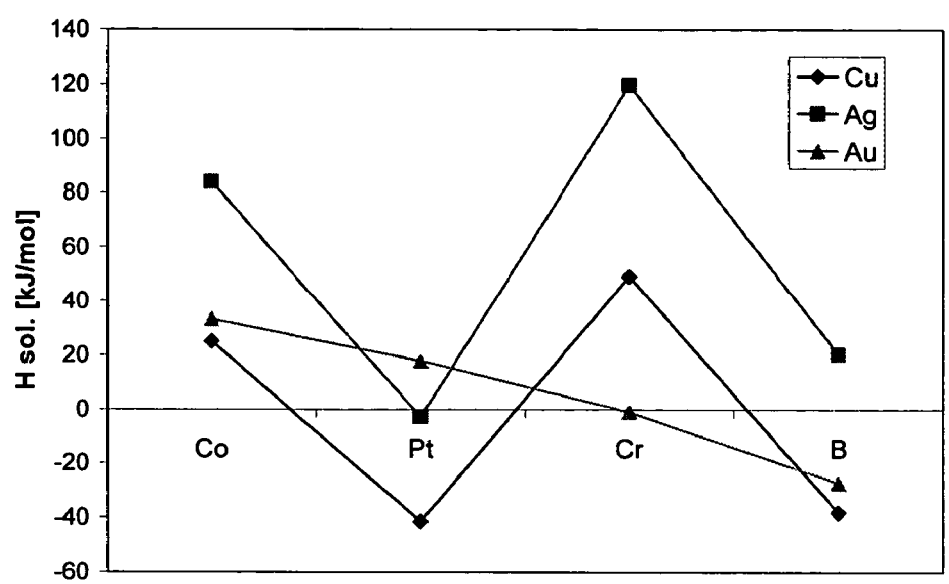
FIG. 2 shows enthalpies of solution of solid X=Cu, Ag, Au in Y=Co, Pt, Cr and B.

In FIG. 2, please note that if $H_{sol}$ of X in Y is positive X does not like to mix with Y and if $H_{sol}$ is negative X likes to mix with Y. The results shown graphically in FIG. 2 demonstrate the following:
(1) Cu does not like to mix with Co and Cr and like to mix with Pt and B;
(2) Ag does not like to mix with Co, Cr and B and like to mix with Pt; and
(3) Au does not like to mix with Co and Pt and like to mix with Cr and B.

CoCrPtB recording media contains CoPt-rich magnetic grains surrounded by nonmagnetic (or weakly magnetic) Cr rich grain boundaries as has been explained in Werner Grogger, Kannan M. Krishnan, Roger A. Ristau, Thomas Thomson, Samuel D. Harkness, Rajiv Ranjan, Appl. Phys. Lett. 80, 1165 (2002). If CoCrPtB recording media has large concentration of B, preferential segregation of B in grain boundaries has been observed. From FIG. 2, it would be expected that Ag and Au will avoid CoPt rich regions (magnetic grains). Moreover, from FIG. 2 it would appear that Ag would also avoid Cr(B) rich regions as well while Au will prefer Cr(B) regions (grain boundaries). The applicants thus concluded that both Ag and Au may be used to improve segregation in CoCrPtB recording media. However, since Au likes to mix with Cr(B) it would be expected that Au would be more uniformly distributed in the grain boundary regions and therefore it would be expected that Au would provide better magnetic grain isolation than Ag. From FIG. 2, one cannot predict position of Cu in CoCrPtB recording media.

Based on the above understanding of the miscibility of Au and Ag in CoCrPtB-containing magnetic recording layer, the embodiments of this invention for longitudinal and perpendicular media could be the following.

Longitudinal recording media:
1. Substrate
2. Non-magnetic seed and under layers, UL, capable of controlling the crystallographic texture of Co-based alloys: Seedlayers may be composed of amorphous or fine grain material such as NiAl, CrTi, CoW, NiP. Underlayers may be Cr-based alloys.
3. Non-magnetic interlayer, IL, that could comprise an alloy material selected from the group consisting of $Co_{100-\delta}Cr_\delta$; with one or more added elements selected from Pt, Ta, B, Mo, Ru, Nb, Hf, Zr. May or may not be present.
4. Magnetic layers with at least one or more Au, Ag-containing layers: In general the magnetic layer/s could comprise an alloy material of CoCr or CoCr with one or more added elements selected from Pt, Ta, B, Mo, Si, Cu, Ag, Au, Ge, Nb, Hf, Zr, Ti, V, W, Fe and Ni. Magnetic layer without Au and Ag will be called "non Au or Ag-containing magnetic layer," ML, and magnetic layers with Au and Ag will be called "Au, Ag-containing magnetic layer," AuAgML. Au, Ag-containing magnetic layers, AuAgML, could comprise $Co_{100-x-y-z-\delta-\alpha-\beta}Cr_xPt_yB_zTa_\delta Ag_\alpha Au_\beta$ alloys where x, y, z, $\alpha$, $\beta$ concentrations satisfy the following rule: x adjusted so that media is magnetic and in general x<30, also, $0 \leq y \leq 30$, $0 \leq z \leq 24$, $0 \leq \delta \leq 8$, $0 \leq \alpha 8$, $0 \leq \beta \leq 8$, $\alpha+\beta>0$. Au, Ag-containing magnetic layers may also contain one or more elements selected from Si, Ti, V, Fe, Ni, Ge, Zr, Nb, Mo, Ru, Hf and W. Amount of Cu in Au, Ag-containing magnetic layers should preferably be less than 10 at. % ($Co_{100-x-y-z-\delta-\alpha-\beta}Cr_xPt_yB_zTa_\delta Ag_\alpha Au_\beta Cu_\gamma$, $\gamma \leq 10$).

Preferably, the rules for x, y, z, $\delta$, $\alpha$, $\beta$ could be the following:
Cr-rich layer:
  (a) $16 \leq x \leq 30$ and $0 \leq z \leq 12$;
  (b) $16 \leq x \leq 30$, $0 \leq z \leq 12$, $0 \leq \alpha \leq 10$, $0 \leq \beta \leq 10$;
  (c) $16 \leq x \leq 30$, $0 \leq y \leq 30$, $0 \leq z \leq 12$, $0 \leq \delta \leq 8$, $0 \leq \alpha \leq 10$, $0 \leq \beta \leq 10$;
Cr-poor layer:
  (a) $0 \leq x < 16$ and $10 \leq z \leq 24$;
  (b) $0 \leq x < 16$, $10 \leq z \leq 24$ and $0 \leq \alpha \leq 10$, $0 \leq \beta \leq 10$;
  (c) $0 \leq x < 16$, $0 \leq y \leq 30$, $10 \leq z \leq 24$, $0 \leq \delta \leq 8$, $0 \leq \alpha \leq 10$, $0 \leq \beta \leq 10$.

More preferably, the possible designs of the magnetic recording layer:
i) magnetic recording media includes at least one magnetic layer that does not contain Au or Ag, ML.
ii) [ML/AuAgML]×n, where n=1 to 10
iii) [Cr-rich AuAgML/Cr-poor AuAgML]×n, where n=1 to 10
iv) [ML/Cr-rich AuAgML/Cr-poor AuAgML]×n, where n=1 to 10
v) $ML_{i1}/AuAgML_{j1}/ML_{i2}/AuAgML_{j2}/ML_{i3}$, where $i_1$, $i_2$, $i_3$, $j_1$, $j_2$=1 to 10, $i_1+i_2+i_3+j_1+j_2 \geq 2$
vi) $[ML]_{i1}[\text{Cr-rich } CuML]_j[ML]_{i2}[\text{Cr-poor } CuML]_k[ML]_{i3}$, where $i_1$, $i_2$, $i_3$, j and k each=0 to 10 and $i_1+i_2+i_3+j+k \geq 3$ AFC media could comprise main (top) layer located closer to recording head and stabilizing (bottom) layer anti-ferromagnetically coupled across non-magnetic spacer layer. Top magnetic recording layer may have any of the layer design specified above. Bottom magnetic layer design may have layer structure $[ML]_{i1}[CuML]_j[ML]_{i2}$, where $i_1$, $i_2$, and j=0 to 10 and $i_1+i_2+j \geq 1$. A space layer can include nearly any non-magnetic composition, and may include Ru, Rh, Ir, Cr, Cu, Re, V and their alloys.
5) Protective carbon layer.

Perpendicular film structure includes:
1) Substrate: Al, Glass or Plastic.
2) An adhesion layer (AL), Example: Cr, CrTi, Ti, NiNb.
3) A soft underlayer (SUL), preferably a Fe-containing alloy containing one or more elements from Co, B, P, Si, C, Zr, Nb, Hf, Ta, Al, Si, Cu, Ag, Au, having a thickness in the range of about 10-400 nm, preferably in the range of about 40-200 nm.
4) Amorphous layer (AmL) may be present preferably if the soft underlayer is not amorphous. Examples include $Ti_\delta Cr_{100-\delta}$, $Ta_\delta Cr_{100-\delta}$ ($30<\delta<60$), and amorphous compositions of NiTa, NiNb, NiP, and CrZr. The thickness of AmL is in the range of about 0-10 nm, preferably in the range of about 0.2-2 nm.

5) Fcc interlayer/s (IL), may optionally be present, comprising one or more elements from Cu, Pt, Ag, Au, Ir, Rh, Re. Also, one or more elements selected from B, C, Si, V, Cr, Mn, Fe, Co, Ni, Cu, Ge, Nb, Mo, Rh, Pd, Ag, Ta, W, Ir, Pt, Au may also be present.

6) Hcp interlayer/s with at least one hcp layer that contains at least one oxide material. The amount of oxide is adjusted such that the interlayer structures may include any combination of Co-rich and (Ru, Ti, Zr, Hf, Re)-rich layer both with and without of oxide. Co-rich layer could comprise Co or Co alloyed with one or more elements selected from B, C, Si, Ti, V, Cr, Mn, Fe, Ni, Cu, Ge, Zr, Nb, Mo, Ru, Rh, Pd, Ag, Hf, Ta, W, Re, Ir, Pt, Au. (Ru, Ti, Zr, Hf, Re)-rich could comprise at least one of Ru, Ti, Zr, Hf, Re with one or more elements selected from B, C, Si, V, Cr, Mn, Fe, Co, Ni, Cu, Ge, Nb, Mo, Rh, Pd, Ag, Ta, W, Ir, Pt, Au.

7) Magnetic layers with at least one or more Au, Ag-containing layers. In general the magnetic layer/s could comprise an alloy material selected from the group consisting of CoCr; CoCr with one or more added elements selected from Pt, Ta, B, Mo, Si, Cu, Ag, Au, Ge, Nb, Hf, Zr, Ti, V, W, Fe and Ni. Au, Ag-containing magnetic layers, AuAgML, comprise of $Co_{100-x-y-z-\delta-\alpha-\beta}Cr_xPt_yB_zTa_\delta Ag_{\alpha Au\beta}$ alloys where x, y, z, α, β concentrations satisfy the following rule: x adjusted so that media is magnetic and in general x<30, also, $0 \leq y \leq 30$, $0 \leq z \leq 10$, $0 \leq \delta \leq 8$, $0 \leq \alpha \leq 8$, $0 \leq \beta \leq 8$, $\alpha + \beta > 0$. Au, Ag-containing magnetic layers may also contain one or more elements selected from Si, Ti, V, Fe, Ni, Ge, Zr, Nb, Mo, Ru, Hf and W. The amount of Cu in Au, Ag-containing magnetic layers should be less than 10 at. % ($Co_{100-x-y-z-\delta-\alpha-\beta}Cr_x$-$P_{t_y}B_zTa_\delta Ag_\alpha Au_\beta Cu_\gamma$, $\gamma \leq 10$).

Preferably, the rules for x, y, z, δ, α, β could be the following:

Cr-rich layer:
(a) $16 \leq x \leq 30$ and $0 \leq z \leq 6$;
(b) $16 \leq x \leq 30$, $0 \leq z \leq 6$, $0 \leq \alpha \leq 10$, $0 \leq \beta \leq 10$;
(c) $16 \leq x \leq 30$, $0 \leq y \leq 30$, $0 \leq z \leq 6$, $0 \leq \delta \leq 8$, $0 \leq \alpha \leq 10$, $0 \leq \beta \leq 10$;

Cr-poor layer:
(a) $0 \leq x < 16$ and $10 \leq z < 24$;
(b) $0 \leq x < 16$, $5 \leq z \leq 10$, and $0 \leq \alpha \leq 10$, $0 \leq \beta \leq 10$;
(c) $0 \leq x < 16$, $0 \leq y \leq 30$, $5 \leq z \leq 10$, $0 \leq \delta \leq 8$, $0 \leq \alpha \leq 10$, $0 \leq \beta \leq 10$;

More preferably, the possible designs of the magnetic recording layer:

i) magnetic recording media includes at least one magnetic layer that does not contain Au or Ag, ML.
ii) [ML/AuAgML]×n, where n=1 to 10
iii) [Cr-rich AuAgML/Cr-poor AuAgML]×n, where n=1 to 10
iv) [ML/Cr-rich AuAgML/Cr-poor AuAgML]×n, where n=1 to 10
v) $ML_{i1}/AuAgML_{j1}/ML_{i2}/AuAgML_{j2}/ML_{i3}$, where $i_1$, $i_2$, $i_3$, $j_1$, $j_2$=1 to 10, $i_1+i_2+i_3+j_1+j_2 \geq 2$
vi) $[ML]_{i1}[Cr\text{-rich } CuML]_j[ML]_{i2}[Cr\text{-poor } CuML]_k[ML]_{i3}$, where $i_1$, $i_2$, $i_3$, j and k each=0 to 10 and $i_1+i_2+i_3+j+k \geq 3$ 7) Protective carbon layer.

The embodiments of the invention provide magnetic recording media suitable for high areal recording density exhibiting high SMNR. The embodiments of the invention achieve such technological advantages by forming a soft underlayer. A "soft magnetic material" is a material that is easily magnetized and demagnetized. As compared to a soft magnetic material, a "hard magnetic" material is one that neither magnetizes nor demagnetizes easily.

The underlayer is "soft" because it is made up of a soft magnetic material, which is defined above, and it is called an "underlayer" because it resides under a recording layer. In a preferred embodiment, the soft layer is amorphous. The term "amorphous" means that the material of the underlayer exhibits no predominant sharp peak in an X-ray diffraction pattern as compared to background noise. The "amorphous soft underlayer" of the embodiments of the invention encompasses nanocrystallites in amorphous phase or any other form of a material so long the material exhibits no predominant sharp peak in an X-ray diffraction pattern as compared to background noise.

When soft underlayers are fabricated by magnetron sputtering on disk substrates, there are several components competing to determine the net anisotropy of the underlayers: effect of magnetron field, magnetostriction of film and stress originated from substrate shape, etc. The soft magnetic underlayer can be fabricated as single layers or a multilayer.

A seedlayer could be optionally included in the embodiments of this invention. A seedlayer is a layer lying in between the substrate and the underlayer. Proper seedlayer can also control anisotropy of the soft underlayer by promoting microstructure that exhibit either short-range ordering under the influence of magnetron field or different magnetostriction. A seedlayer could also alter local stresses in the soft underlayer.

Preferably, in the underlayer of the perpendicular recording medium of the embodiments of the invention, an easy axis of magnetization is directed in a direction substantially transverse to a traveling direction of the magnetic head. This means that the easy axis of magnetization is directed more toward a direction transverse to the traveling direction of the read-write head than toward the traveling direction. Also, preferably, the underlayer of the perpendicular recording medium has a substantially radial or transverse anisotropy, which means that the domains of the soft magnetic material of the underlayer are directed more toward a direction transverse to the traveling direction of the read-write head than toward the traveling direction. In one embodiment, the direction transverse to the traveling direction of the read-write head is the direction perpendicular to the plane of the substrate of the recording medium.

In accordance with embodiments of this invention, the substrates that may be used in the embodiments of the invention include glass, glass-ceramic, NiP/aluminum, metal alloys, plastic/polymer material, ceramic, glass-polymer, composite materials or other non-magnetic materials. Glass-ceramic materials do not normally exhibit a crystalline surface. Glasses and glass-ceramics generally exhibit high resistance to shocks.

A preferred embodiment of this invention is a perpendicular recording medium comprising at least two amorphous soft underlayers with a spacer layer between the underlayers and a recording layer. The amorphous soft underlayer should preferably be made of soft magnetic materials and the recording layer should preferably be made of hard magnetic materials. The amorphous soft underlayer is relatively thick compared to other layers. The interlayer can be made of more than one layer of non-magnetic materials. The purpose of the interlayer is to prevent an interaction between the amorphous soft magnetic underlayer and recording layer. The interlayer could also promote the desired properties of the recording layer.

The underlayer and magnetic recording layer could be sequentially sputter deposited on the substrate, typically by magnetron sputtering, in an inert gas atmosphere. A carbon overcoat could be typically deposited in argon with nitrogen, hydrogen or ethylene. Conventional lubricant topcoats are typically less than about 20 Å thick.

Amorphous soft underlayers could produce smoother surfaces as compared to polycrystalline underlayers. Therefore, amorphous soft underlayer could be one way of reducing the roughness of the magnetic recording media for high-density perpendicular magnetic recording. The amorphous soft underlayer materials include a Cr-doped Fe-alloy-containing underlayer, wherein the Fe-alloy could be CoFeZr, CoFeTa, FeCoZrB and FeCoB.

Another advantage of amorphous materials as soft underlayer materials is the lack of long-range order in the amorphous material. Without a long-range order, amorphous alloys have substantially no magnetocrystalline anisotropy. The use of amorphous soft underlayer could be one way of reducing noise caused by ripple domains and surface roughness. The surface roughness of the amorphous soft underlayer is preferably below 1 nm, more preferably below 0.5 nm, and most preferably below 0.2 nm.

In accordance with the embodiments of the invention, the test methods for determining different parameters are as follows. If a particular test method has not been explicitly stated below to determine a parameter, then a conventional method used by persons of ordinary skill in this art could be used to determine that parameter.

Coercivity ($H_c$): In the embodiments of this invention, the preferred range of $H_c$ is 2500 to 9000, more preferably 4000 to 7000 Oe.

Mrt: Product of remanent magnetization and magnetic layer thickness: In the embodiments of this invention, the preferred range of Mrt is 0.2-1 memu/cm$^2$, more preferably, 0.30-0.7 memu/cm$^2$.

S*: Slope of remanence magnetization curve dMr/dH at the point where Mr=0.

MFA: middle frequency amplitude.

LFA: low frequency amplitude.

PW50 is measure of transition width (between two written bits). In the embodiments of this invention, a lower PW50 value is preferred.

OW means overwrite. In the embodiments of this invention, the preferred range of OW includes high values.

SNRmed: Media signal to noise ratio. In the embodiments of this invention, the preferred range of SNRmed includes high values.

SNRel: Electronic signal to noise ratio. In the embodiments of this invention, the preferred range of SNRel includes high values.

SNRtot: Total signal to noise ratio. In the embodiments of this invention, the preferred range of SNRtot is a higher value.

The advantageous characteristics attainable by the embodiments of the invention are illustrated in the following examples.

EXAMPLES

All samples described in this disclosure were fabricated with DC magnetron sputtering except carbon films were made with AC magnetron sputtering.

Applicants investigated investigated the following media structures:

Media 1. Substrate/UL/BL/Ru/ML$_1$/ML(Co—Cr—Pt—B)
Media 2. Substrate/UL/BL/Ru/ML$_1$/CuML(Co—Cr—Pt—B—Cu)
Media 3. Substrate/UL/BL/Ru/ML$_1$/AuAgML(Co—Cr—Pt—B—Ag)
Media 4. Substrate/UL/BL/Ru/ML$_1$/AuAgML(Co—Cr—Pt—B—Au)

In the above media investigated, Cr in ML(Co—Cr—Pt—B) is substituted by Cu, Ag and Au in CuML(Co—Cr—Pt—B—Cu), AuAgML(Co—Cr—Pt—B—Ag) and AuAgML(Co—Cr—Pt—B—Au), respectively. The recording data are presented in Table 1. Table 1 shows that recording performance of magnetic media can be improved by substituting Cu, Ag and Au for Cr, i.e., by addition of Cu, Ag and Au to magnetic recording layers: Signal to noise ratio of media (SNRmed) with AuAgML(Co—Cr—Pt—B—Au) magnetic layer, media 4, is ~0.7 dB higher than SNRmed of recording media without AuAgML(Co—Cr—Pt—B—Au) magnetic layer, media 1.

TABLE 1

|  | $H_C$ [Oe] | MrT [memu/cm$^2$] | S* | MFA [mV] | LFA [mV] | PW50 [µinch] | OW [dB] | SNRmed [dB] | SNRel [dB] | SNRtot [dB] |
| --- | --- | --- | --- | --- | --- | --- | --- | --- | --- | --- |
| Media 1 | 4657 | 0.33 | 0.86 | 1.16 | 1.46 | 3.4 | 36.0 | 14.5 | 16.2 | 12.3 |
| Media 2 (Cu) | 4516 | 0.32 | 0.86 | 1.16 | 1.45 | 3.4 | 37.3 | 15.1 | 16.2 | 12.6 |
| Media 3 (Ag) | 4354 | 0.34 | 0.86 | 1.25 | 1.57 | 3.5 | 40.0 | 14.7 | 16.4 | 12.5 |
| Media 4 (Au) | 4643 | 0.31 | 0.85 | 1.18 | 1.47 | 3.3 | 37.6 | 15.2 | 16.4 | 12.8 |

Applicants measured a lattice constant of ML(Co—Cr—Pt—B), CuML(Co—Cr—Pt—B—Cu), AuAgML(Co—Cr—Pt—B—Ag) and AuAgML(Co—Cr—Pt—B—Au) magnetic layers. Table 2 shows that the lattice constant a of ML(Co—Cr—Pt—B) does not change if Cr is substituted by Cu, Ag and Au. This indicates that Ag and Au do not substitute for Co (or Cr if present) in CoPt rich magnetic grains. Ag and Au atoms are significantly bigger than Co atom so they would expand lattice constants of magnetic grains if they replace Co (or Cr if present) in these grains.

TABLE 2

|  | Co [11-20] | Atom diameter [nm] | a = λ/sinθ [nm] |
| --- | --- | --- | --- |
| CuML(CoCrPtB) | 73.15 | Co = 0.250, Pt = 0.278, Cr = 0.260 | 0.2588 |
| CuML(CoCrPtBCu) | 72.98 | Cu = 0.256 | 0.2593 |
| AuAgML(CoCrPtBAg) | 73.08 | Ag = 0.288 | 0.2590 |
| AuAgML(CoCrPtBAu) | 72.95 | Au = 0.292 | 0.2594 |

Applicants also measured the saturation magnetization, $M_s$, of ML(Co—Cr—Pt—B), CuML(Co—Cr—Pt—B—Cu), AuAgML(Co—Cr—Pt—B—Ag) and AuAgML(Co—Cr—Pt—B—Au) magnetic layers. Table 3 shows ~12% increase in $M_s$ if Cr is substituted by Ag or Au and ~5% increase in $M_s$ if Cr is substituted by Cu.

TABLE 3

|  | $M_s$ [emu/cm³] |
| --- | --- |
| CuML(CoCrPtB) | 243 |
| CuML(CoCrPtBCu) | 257 |
| AuAgML(CoCrPtBAg) | 275 |
| AuAgML(CoCrPtBAu) | 275 |

Figure 1:
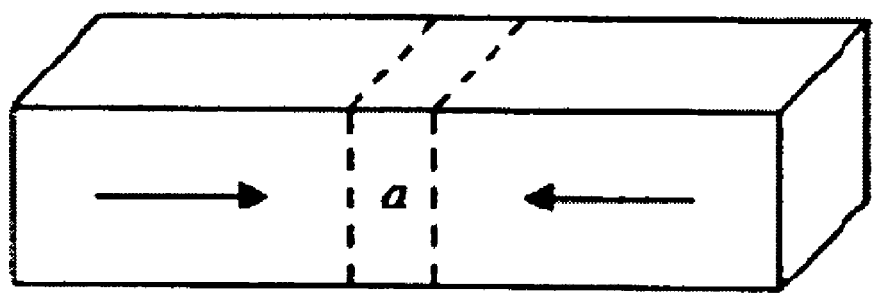
FIG. 1 shows (a) longitudinal and (b) perpendicular recording bits.
Figure 1:
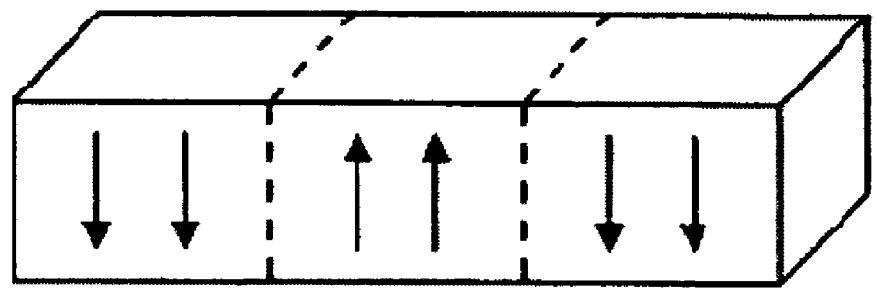

It follows from Table 2 and Table 3 and FIG. 1 that Ag and Au mainly segregate in the grain boundary regions. Cu position in the magnetic layer is not certain. However, only Au likes to mix with Cr(B) that can lead to more uniformly distribution of Au in the grain boundary regions. Thus it is expected that Au will provide better magnetic grain isolation in CoCrPtB magnetic layers than Ag and Cu resulting in improved media performance, see Table 3.

This application discloses several numerical range limitations that support any range within the disclosed numerical ranges even though a precise range limitation is not stated verbatim in the specification because this invention can be practiced throughout the disclosed numerical ranges. Finally, the entire disclosure of the patents and publications referred in this application are hereby incorporated herein in entirety by reference.

The invention claimed is:

1. A perpendicular magnetic recording medium comprising a substrate and a magnetic recording layer on the substrate, wherein the magnetic recording layer has the following layered structure:

$$ML_{i1}/AuAgML_{j1}/ML_{i2}/AuAgML_{j2}/ML_{i3}$$

wherein i1, i2, i3, j1, j2 =1 to 10, and wherein
the ML layers are non Au or Ag-containing magnetic layers that comprise Co, Cr, Pt and B; and
the AuAgML layers comprise Co, greater than 0 at % but less than or equal to 30 at % Pt, greater than 0 at % but less than or equal to 10 at % B, greater than 0 at % but less than 30 at % Cr, and greater than 0 at % but less than or equal to 8 at % of at least one of Ag and Au.

2. The perpendicular magnetic recording medium of claim 1, wherein any of the AuAgML layers further comprise greater than 0 at % but less than or equal to 8 at % Ta.

3. The perpendicular magnetic recording medium of claim 1, wherein ML is CoCrPtB and AuAgML is at least one of CoCrPtBAg and CoCrPtBAu.

4. The perpendicular magnetic recording medium of claim 1, wherein ML is CoCrPtB and AuAgML is CoCrPtBAu.

5. The perpendicular magnetic recording medium of claim 1, wherein any of the AuAgML layers further comprise greater than 0 at % but less than or equal to 10 at % Cu.

6. The perpendicular magnetic recording medium of claim 1, wherein the ML layers further comprise one or more of Mo, Si, Cu, Ag, Au, Ge, Nb, Hf, Zr, Ti, V, W, Fe and Ni.

7. The perpendicular magnetic recording medium of claim 1, wherein the AuAgML layers further comprise one or more of Si, Ti, V, Fe, Ni, Ge, Zr, Nb, Mo, Ru, Hf and W.

8. A perpendicular magnetic recording medium, comprising:
a substrate;
a first amorphous layer, wherein the first amorphous layer comprises an Fe alloy;
a second amorphous layer different from the first amorphous layer, wherein the second amorphous layer comprises at least one of TiCr, TaCr, NiTa, NiNb, NiP and CrZr;
a magnetic recording layer with the following layered structure:

$$ML_{i1}/AuAgML_{j1}/ML_{i2}/AuAgML_{j2}/ML_{i3}$$

wherein i1, i2, i3, j1, j2 =1 to 10, and wherein
the ML layers comprise Co, Cr, Pt and B; and
the AuAgML layers are non Au or Ag-containing magnetic layers that comprise Co, greater than 0 at % but less than or equal to 30 at % Pt, greater than 0 at % but less than or equal to 10 at % B, greater than 0 at % but less than 30 at % Cr, and greater than 0 at % but less than or equal to 8 at % of at least one of Ag and Au; and
at least one interlayer between the second amorphous layer and the magnetic recording layer.

9. The perpendicular magnetic recording medium of claim 8, wherein the interlayer is selected from the group consisting of a Fcc interlayer, a Hcp interlayer, and combinations thereof.

10. The perpendicular magnetic recording medium of claim 9, wherein the Fcc interlayer comprises one or more elements selected from the group consisting of Cu, Pt, Ag, Au, Ir, Rh, and Re.

11. The perpendicular magnetic recording medium of claim 9, wherein the Hcp interlayer comprises at least one oxide, and wherein the Hcp interlayer comprises at least one of Co, Ru, Ti, Zr, Hf and Re.

12. The perpendicular magnetic recording medium of claim 8, wherein ML is CoCrPtB and AuAgML is at least one of CoCrPtBAg and CoCrPtBAu.

13. The perpendicular magnetic recording medium of claim 8, wherein ML is CoCrPtB and AuAgML is CoCrPtBAu.

* * * * *

UNITED STATES PATENT AND TRADEMARK OFFICE
CERTIFICATE OF CORRECTION

PATENT NO. : 8,101,292 B2  
APPLICATION NO. : 12/771962  
DATED : January 24, 2012  
INVENTOR(S) : Erol Girt et al.

Page 1 of 1

It is certified that error appears in the above-identified patent and that said Letters Patent is hereby corrected as shown below:

Column 10, line 32, Claim 9: "a Hep interlayer" should read --a Hcp interlayer--.

Signed and Sealed this  
Thirteenth Day of March, 2012

David J. Kappos  
*Director of the United States Patent and Trademark Office*